United States Patent
Meyer

(10) Patent No.: US 7,048,230 B2
(45) Date of Patent: May 23, 2006

(54) LAMINAR FLOW NACELLE FOR AN AIRCRAFT ENGINE

(75) Inventor: Pascal J Meyer, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/842,446

(22) Filed: May 11, 2004

(65) Prior Publication Data

US 2005/0151026 A1    Jul. 14, 2005

(30) Foreign Application Priority Data

May 29, 2003   (GB) .................................. 0312279

(51) Int. Cl.
*B64C 1/38* (2006.01)
(52) U.S. Cl. ...................... 244/130; 244/208
(58) Field of Classification Search ............... 244/199, 244/200, 204, 208, 209, 130
See application file for complete search history.

(56) References Cited

U.S. PATENT DOCUMENTS

| | | | | |
|---|---|---|---|---|
| 2,742,247 | A * | 4/1956 | Lachmann | 244/130 |
| 5,167,387 | A | 12/1992 | Hartwich | |
| 5,297,765 | A | 3/1994 | Hughes | |
| 5,618,363 | A * | 4/1997 | Mullender et al. | 156/62.2 |
| 5,743,493 | A * | 4/1998 | McCaughan | 244/130 |
| 5,772,156 | A * | 6/1998 | Parikh et al. | 244/209 |
| 6,752,358 | B1 * | 6/2004 | Williams et al. | 244/208 |

FOREIGN PATENT DOCUMENTS

| | | |
|---|---|---|
| EP | 0599502 A | 6/1994 |
| GB | 2232132 A | 12/1990 |
| GB | 2285669 A | 7/1995 |
| GB | 2294709 A | 5/1996 |
| GB | 2296306 A | 6/1996 |
| GB | 2314887 A | 1/1998 |

* cited by examiner

*Primary Examiner*—Tien Dinh
(74) *Attorney, Agent, or Firm*—W. Warren Taltavull; Manelli Denison & Selter PLLC

(57) ABSTRACT

A laminar flow nacelle for an aircraft engine (10) has an outer member (26) defining an aerodynamic shape. The nacelle (24) has an inner member (28) defining a chamber (30) with the outer member (26) of the nacelle (24). The outer member (26) of the nacelle (24) has a porous region (32) at a first region (34) of the outer member (26) and the porous region (32) allows a flow of fluid into the chamber (30). A duct (36) connects the chamber (30) to an aperture (38) in the outer member (26) at a second region (40) of the outer member (26) downstream of the first region (34). In operation the static pressure at the first region (34) is greater than the static pressure at the second region (40) such that the boundary layer of the fluid flows through the porous region (32) at the first region (34) through the duct (36) to the aperture (38) at the second region (40). The first region (34) extends between 10% and 20% of the chord length of the nacelle (24) from the highlight (42) of the nacelle (24). The second region (40) extends between 50% and 70% of the chord length of the nacelle (24) from the highlight (42).

17 Claims, 2 Drawing Sheets

LAMINAR FLOW NACELLE FOR AN AIRCRAFT ENGINE

The present invention relates to a laminar flow nacelle for an aircraft engine, particularly to a laminar flow nacelle for a gas turbine engine and in particular to a laminar flow nacelle for a turbofan gas turbine engine.

The achievement of laminar flow over the surface of an aircraft may lead to significant drag reduction and hence fuel savings. It is known to delay the transition from laminar to turbulent flow over a surface of an aircraft by applying suction to the surface. The boundary layer is sucked through pores in the surface to prevent the onset of turbulence. This is known as laminar flow control.

It is known to provide laminar flow over the surface of the nacelle of an aircraft engine by sucking the boundary layer from the surface of the nacelle into the interior of the nacelle using ducts, valves and a pump, driven by an electric motor or a fuel powered motor etc.

The problem with this laminar flow arrangement is that the use of ducts, valves and a pump adds weight and complexity to the laminar flow arrangement. There is also a requirement for maintenance of the laminar flow arrangement and therefore there is a need for access panels in the outer member of the nacelle. Access panels in the outer member of the nacelle produce perturbations in the flow over the outer member of the nacelle and increase drag.

Accordingly the present invention seeks to provide a novel laminar flow nacelle for an aircraft engine, which reduces, preferably overcomes, the above-mentioned problems.

Accordingly the present invention provides a laminar flow nacelle for an aircraft engine, the nacelle having an outer member defining an aerodynamic shape for a fluid, the nacelle having an inner member defining a chamber with the outer member of the nacelle, the outer member of the nacelle having a porous region at a first region of the outer member, the porous region allowing a flow of fluid into the chamber, at least one duct to connect the chamber to at least one aperture in the outer member at a second region of the outer member downstream of the first region, whereby in operation the static pressure at the first region being greater than the static pressure at the second region such that at least some of the boundary layer of the fluid flows through the porous region at the first region of the nacelle through the at least one duct to the at least one aperture at the second region.

The nacelle having a highlight and a chord length.

Preferably the first region extends between 5% and 25% of the chord length of the nacelle from the highlight of the nacelle.

Preferably the first region extends between 10% and 20% of the chord length of the nacelle from the highlight of the nacelle.

Preferably the second region extends between 50% and 70% of the chord length of the nacelle from the highlight of the nacelle.

Preferably the second region extends between 55% and 65% of the chord length of the nacelle from the highlight of the nacelle.

The first region of the outer member may comprise a porous member, the porous member may comprise a porous metal or a porous composite.

A plurality of backing members are provided between the porous member and the chamber to control the fluid flow through the porous member to the chamber, each backing member has an aperture and adjacent backing members in the direction of flow have different sizes of aperture.

The first region of the outer member may comprise foam.

Preferably the first region of the outer member comprises a plurality of foam portions and adjacent foam portions in the direction of flow have different densities or thickness.

Alternatively a backing member is provided between the foam and the chamber to control the fluid flow through the foam to the chamber, the backing member has apertures spaced apart in the direction of flow and adjacent apertures in the direction of flow have different sizes.

Alternatively the foam may have a variable density or variable thickness in the direction of flow.

Preferably the foam comprises a metal foam or a plastic foam.

Preferably the aircraft engine is a gas turbine engine. Preferably the gas turbine engine is a turbofan gas turbine engine.

The present invention also provides a laminar flow surface for an aircraft, the surface having an outer member defining an aerodynamic shape for a fluid, the surface having an inner member defining a chamber with the outer member of the surface, the outer member of the surface having a porous region at a first region of the outer member, the porous region allowing a flow of fluid into the chamber, at least one duct to connect the chamber to at least one aperture in the outer member at a second region of the outer member downstream of the first region, whereby in operation the static pressure at the first region being greater than the static pressure at the second region such that at least some of the boundary layer of the fluid flows through the porous region at the first region of the surface through the at least one duct to the at least one aperture at the second region.

The present invention will be more fully described by way of example with reference to the accompanying drawings in which:—

Figure 1:
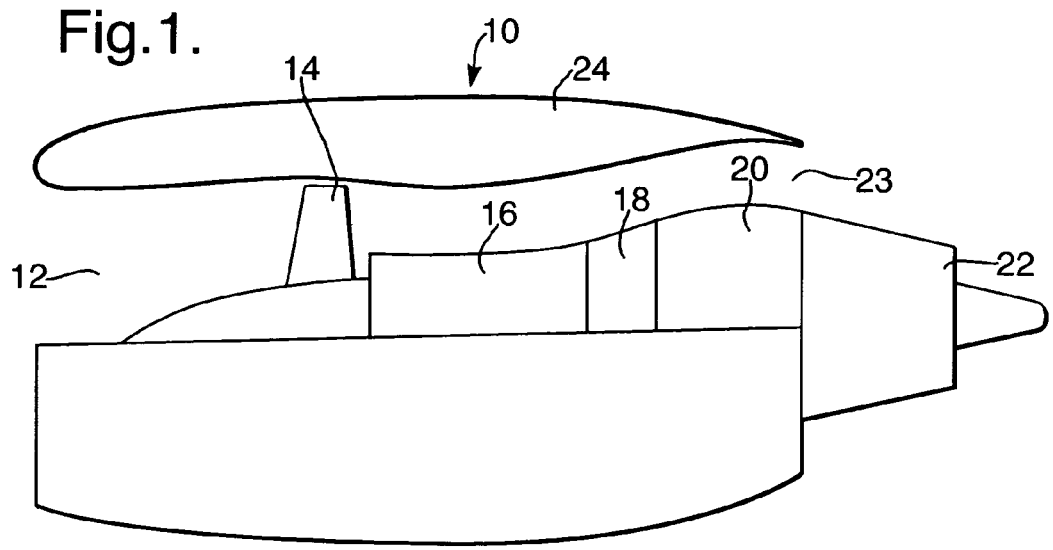
FIG. 1 is a view of a turbofan gas turbine engine having a laminar flow nacelle according to the present invention.

A turbofan gas turbine engine 10, as shown in FIG. 1, comprises in axial flow series an intake 12, a fan section 14, a compressor section 16, a combustion section 18, a turbine section 20 and an exhaust nozzle 22. The turbine section 20 comprises one or more low-pressure turbines (not shown) to drive a fan (not shown) in the fan section 14 and one or more high-pressures to drive a high-pressure compressor (not shown) in the compressor section (16). The turbine section 20 may also comprise one or more intermediate-pressure turbines (not shown) to drive an intermediate-pressure compressor (not shown) in the compressor section 16.

Figure 2:
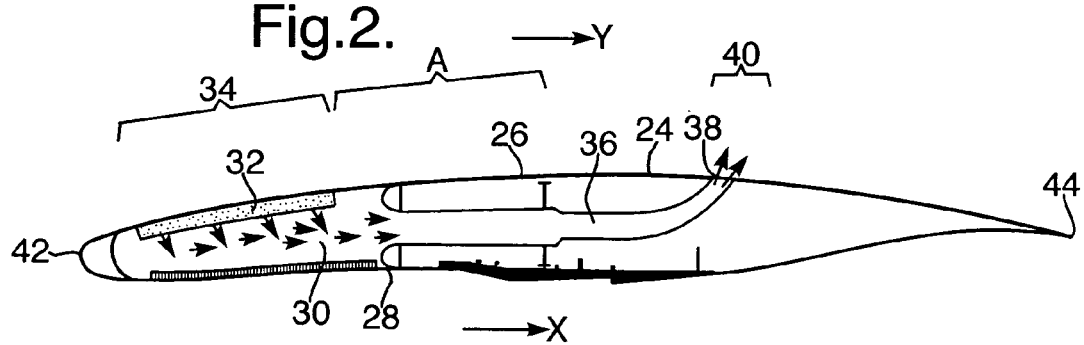
FIG. 2 is an enlarged cross-sectional view through the laminar flow nacelle shown in FIG. 1.

The turbofan gas turbine engine 10, as shown more clearly in FIG. 2, also comprises a nacelle 24 arranged coaxially with the turbofan gas turbine engine 10. The nacelle 24 has an outer member 26 defining a generally convex aerodynamic shaped surface and the nacelle 24 has an inner member 28 defining a chamber 30 with the outer member 26 of the nacelle 24. The outer member 26 of the nacelle 24 has a porous region 32 at a first region 34 of the outer member 26 and the porous region 32 allows a flow of fluid into the chamber 30. One or more ducts 36 connect the chamber 30 to at least one aperture 38 in the outer member 26 at a second region 40 of the outer member 26 downstream of the first region 34. The at least one aperture 38 preferably comprises a porous member.

The nacelle 24 has a highlight at its upstream end 42 and the nacelle 24 has a chord length extending from the upstream end 42 to the downstream end 44.

The first region 34 of the outer member 26 extends between a position at 5% of the chord length of the nacelle 42 from the highlight 42 to a position at 25% of the chord length of the nacelle 24 from the highlight 42 of the nacelle 24. Preferably the first region 34 extends between a position at 10% of the chord length of the nacelle 24 from the highlight 42 to a position at 20% of the chord length of the nacelle 24 from the highlight 42 of the nacelle 24.

The second region 40 of the outer member 26 extends between a position at 50% of the chord length of the nacelle 24 from the highlight 42 to a position at 70% of the chord length of the nacelle 24 from the highlight 42 of the nacelle 24. Preferably the second region 40 extends between a position at 55% of the chord length of the nacelle 24 from the highlight 42 to a position at 65% of the chord length of the nacelle 24 from the highlight 42 of the nacelle.

The at least one aperture 38 may produce a gap in the outer member 26 of the nacelle 24 and the at least one aperture 38 may be used for turbulent flow control.

Figure 3:
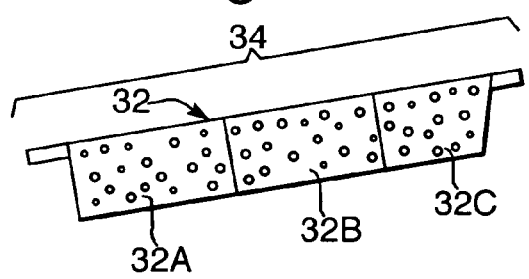
FIG. 3 is a further enlarged cross-sectional view of a porous region of the laminar flow nacelle shown in FIG. 2.

The porous region 32 at the first region 34 of the nacelle 24 is shown more clearly in FIG. 3. The porous region 32 comprises a foam structure, which is porous. The porous region 32 comprises a number of annular porous foam members 32A, 32B and 32C arranged adjacent each other in the direction of flow. Alternatively each of the porous foam members 32A, 32B and 32C may comprises number of part annular portions. The porous foam members 32A, 32B and 32C have different densities and/or thicknesses to control the flow of fluid through the different porous foam members 32A, 32B and 32C of the porous region 32 to the chamber 30. The density and/or thickness of the porous foam members 32A, 32B and 32C increases in the direction of flow, thus porous foam member 32A has the smallest density, the porous foam member 32B has an intermediate density and porous foam member 32C has the greatest density.

Figure 4:
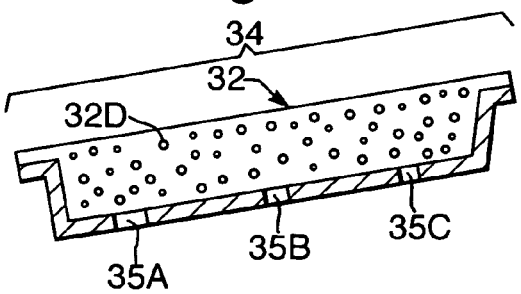
FIG. 4 is further enlarged alternative cross-sectional view of a porous region of the laminar flow nacelles shown in FIG. 2.

An alternative arrangement for the porous region 32 at the first region 34 of the nacelle 24 is shown in FIG. 4. Again the porous region 32 comprises a foam structure, which is porous. The porous region 32 comprises a single annular porous foam member 32D, or a number of part annular porous foam members 32D, and annular backing member, or a number of part annular backing member, 33 is provided between the porous foam member 32D and the chamber 30 to control the fluid flow through the different zones of the porous foam member 32D to the chamber 30. The annular backing member 33 has a plurality of sets of apertures 35A, 35B and 35C spaced apart in the direction of flow and adjacent apertures 35A, 35B and 35C in the direction of flow have different sizes. Each of the set of apertures 35A, 35B and 35C comprises a plurality of circumferentially spaced apertures. The apertures 35A have the largest size, the apertures 35B has an intermediate size and the apertures 35C has the smallest size.

The porous foam members may comprise a porous metal foam or a porous plastic foam or other suitable porous foam.

A further alternative is to provide a porous foam member in which the density and/or thickness varies in the direction of the flow.

The region A of the outer member 26 of the nacelle 24 between a position at 25% of the chord length of the nacelle 24 from the highlight 42 to a position at 45% of the chord length of the nacelle 24 from the highlight 42 is arranged to provide a laminar flow by ensuring that there are no access panels.

In operation during flight, at least during cruise conditions of the aircraft, there is an internal fluid, air, flow X through the nacelle 24 to the turbofan gas turbine engine 10 and an external fluid, air, flow Y over the outer member 26 of the nacelle 24. Due to the aerodynamic shape of the outer member 26 of the nacelle 24 a favourable pressure gradient is generated around the profile of the nacelle 24. In particular the static pressure at the first region 34 of the nacelle 24 is greater than the static pressure at the second region 40 of the nacelle 24 and therefore the static pressure at the first region 34 of the nacelle 24 is greater than the static pressure in the chamber 30 within the nacelle 24 due to the interconnection of the chamber 30 and the second region 40 by the duct, or ducts, 36. This pressure difference causes at least some of the boundary layer of the fluid, air, on the first region 34 of the nacelle 24 to flow through the porous region 32 at the first region 34 of the nacelle 24 into the chamber 30 and then through the duct, or ducts, 36 to the at least one aperture 38 at the second region 40 of the nacelle 24. The suction of the boundary layer from the first region 34 of the outer member 26 of the nacelle 24 reduces drag and therefore increases efficiency of the turbofan gas turbine engine 10, particularly at cruise conditions. The pressure gradient of the flow on the aerodynamic surface of the outer member 26 of the nacelle 24 allows a laminar flow type of boundary layer to settle from the nacelle 24 highlight 42 over a significant chord wise length, approximately 30% to 60% of the chord length.

The advantage of the present invention is that there is no need for a pump, valve and associated ducts to bleed the boundary layer from the outer member of the nacelle as in the prior art. This reduced the weight and complexity of the laminar flow arrangement. Also the laminar flow arrangement has a requirement for low maintenance and therefore the need for access panels in the outer member of the nacelle is reduced. The removal of the access panels in the outer member of the nacelle reduced perturbations in the flow over the outer member of the nacelle and therefore reduces drag.

Figure 5:
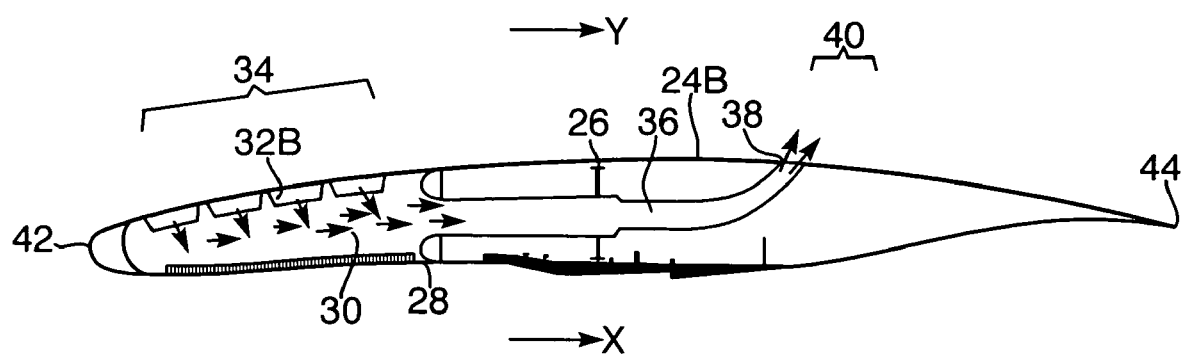
FIG. 5 is an alternative cross-sectional view through the laminar flow nacelle shown in FIG. 1.
Figure 6:
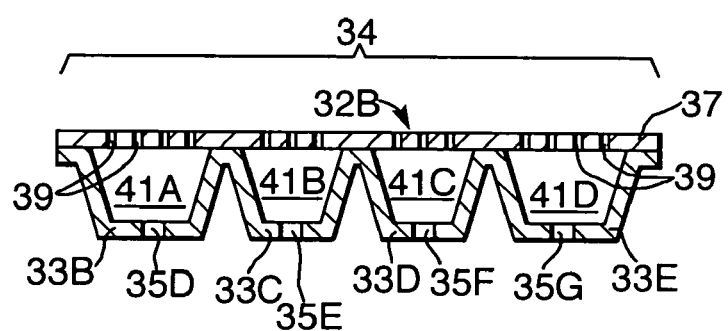
FIG. 6 is a further enlarged cross-sectional view of a porous region of the laminar flow nacelle shown in FIG. 5.

An alternative nacelle 24B for the turbofan gas turbine engine 10 is shown in figures 5 and 6, and the nacelle 24B is similar to the nacelle 24 and like parts are shown by like numerals. The nacelle 24B has a porous region 32B in the first region 34 and the porous region 32B comprises an annular perforated member, or a number of part annular perforated members 37, which has apertures 39. The perforated member 37 comprises a perforated metal member or a perforated composite member. A plurality of backing members 33B, 33C, 33D and 33E are provided to define annular chambers 41A, 41B, 41C and 41D with perforated member 37. Each backing member may comprise an annular backing member or a number of part annular backing members. The backing members 33B, 33C, 33D and 33E are provided between the perforated metal member 37 and the chamber 30 to control the fluid flow through different zones of the perforated metal member 37 to the chamber 30. The backing members 33B, 33C, 33D and 33E have apertures 35D, 35E, 35F and 35G respectively spaced apart in the direction of flow and adjacent apertures 35D, 35E, 35F and 5G in the direction of flow have different sizes. The apertures 35D have the largest size, the apertures 35E and 35F have an intermediate size and the aperture 35G have the smallest size.

Although the present invention has been described with reference to a turbofan gas turbine engine, the present invention is applicable to other aircraft engines.

Although the present invention has been described with reference to a laminar flow nacelle for an aircraft engine, the present invention may be applicable to a laminar flow surface of an upper, convex, surface of an aircraft wing.

I claim:

1. A laminar flow nacelle for an aircraft engine, the nacelle having an outer member defining an aerodynamic shape for a fluid, the nacelle having an inner member defining a chamber with the outer member of the nacelle, the outer member of the nacelle having a porous region at a first region of the outer member, the porous region allowing a flow of fluid, free of any pump, into the chamber, at least one duct to connect the chamber to at least one aperture in the outer member at the second region of the outer member downstream of the first region, whereby in operation the static pressure at the first region being greater than the static pressure at a second region such that at least some of the boundary layer of the fluid flows through the porous region at the first region of the nacelle through the at least one duct to the at least one aperture at the second region with said duct being free of any obstruction.

2. A laminar flow nacelle as claimed in claim 1 wherein the nacelle having a highlight and a chord length.

3. A laminar flow nacelle as claimed in claim 2 wherein the first region extends between 5% and 25% of the chord length of the nacelle from the highlight of the nacelle.

4. A laminar flow nacelle as claimed in claim 3 wherein the first region extends between 10% and 20% of the chord length of the nacelle from the highlight of the nacelle.

5. A laminar flow nacelle as claimed in claim 2, wherein the second region extends between 50% and 70% of the chord length of the nacelle from the highlight of the nacelle.

6. A laminar flow nacelle as claimed in claim 5 wherein the second region extends between 55% and 65% of the chord length of the nacelle from the highlight of the nacelle.

7. A laminar flow nacelle as claimed in claim 1 wherein the first region of the outer member comprises a porous member.

8. A laminar flow nacelle as claimed in claim 7 wherein the porous member comprises a porous metal or a porous composite.

9. A laminar flow nacelle for an aircraft engine, the nacelle having an outer member defining an aerodynamic shape for a fluid, the nacelle having an inner member defining a chamber with the outer member of the nacelle, the outer member of the nacelle having a porous region at a first region of the outer member, the porous region allowing a flow of fluid into the chamber, at least one duct to connect the chamber to at least one aperture in the outer member at a second region of the outer member downstream of the first region, whereby in operation the static pressure at the first region being greater than the static pressure at the second region such that at least some of the boundary layer of the fluid flows through the porous region at the first region of the nacelle through the at least one duct to the at least one aperture at the second region wherein the first region of the outer member comprises a porous member wherein a plurality of backing members are provided between the porous member and the chamber to control the fluid flow through the porous member to the chamber, each backing member having an aperture and adjacent backing members in the direction of flow having different sizes of aperture.

10. A laminar flow nacelle as claimed in claim 1 wherein the first region of the outer member comprises foam.

11. A laminar flow nacelle for an aircraft engine, the nacelle having an outer member defining an aerodynamic shape for a fluid, the nacelle having an inner member defining a chamber with the outer member of the nacelle, the outer member of the nacelle having a porous region at a first region of the outer member, the porous region allowing a flow of fluid into the chamber, at least one duct to connect the chamber to at least one aperture in the outer member at a second region of the outer member downstream of the first region, whereby in operation the static pressure at the first region being greater than the static pressure at the second region such that at least some of the boundary layer of the fluid flows through the porous region at the first region of the nacelle through the at least one duct to the at least one aperture at the second region wherein the first region of the outer member comprises foam wherein the first region of the outer member comprises a plurality of foam portions and adjacent foam portions in the direction of flow have different densities or different thickness.

12. A laminar flow nacelle as claimed in claim 11 wherein a backing member is provided between the foam and the chamber to control the fluid flow through the foam to the chamber, the backing member having apertures spaced apart in the direction of flow and adjacent apertures in the direction of flow having different sizes.

13. A laminar flow nacelle as claimed in claim 11 wherein the foam has a variable density or variable thickness in the direction of flow.

14. A laminar flow nacelle as claimed in claim 10 wherein the foam comprises a metal foam or a plastic foam.

15. A laminar flow nacelle as claimed in claim 1 wherein the aircraft engine is a gas turbine engine.

16. A laminar flow nacelle as claimed in claim 15 wherein the gas turbine engine is a turbofan gas turbine engine.

17. A laminar flow nacelle for an aircraft engine, the nacelle having an outer member defining an aerodynamic shape for a fluid, the nacelle having an inner member defining a chamber with the outer member of the nacelle, the outer member of the nacelle having a porous region at a first region of the outer member, the porous region allowing a flow of fluid into the chamber, at least one duct to connect the chamber to at least one aperture in the outer member at a second region of the outer member downstream of the first region, whereby in operation the static pressure at the first region being greater than the static pressure at a second region such that at least some of the boundary layer of the fluid flows through the porous region at the first region of the nacelle through the at least one duct to the at least one aperture at the second region wherein the nacelle having a highlight and a chord length wherein the first region extends between 5% and 25% of the chord length of the nacelle from the highlight of the nacelle and wherein the second region extends between 50% and 70% of the chord length of the nacelle from the highlight of the nacelle.

* * * * *